United States Patent
Clem et al.

(10) Patent No.: US 10,956,926 B1
(45) Date of Patent: Mar. 23, 2021

(54) SYSTEM FOR PROCESSING A DIGITAL PROMOTION BASED UPON A GUEST CHECK PRODUCT AND RELATED METHODS

(71) Applicant: INMAR CLEARING, INC., Winston-Salem, NC (US)

(72) Inventors: Greg Clem, Seattle, WA (US); Nathanael Georgeson, Seattle, WA (US); Samuel May, Kent, WA (US); O'Ryan McEntire, Seattle, WA (US); Zackary Smith, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 178 days.

(21) Appl. No.: 16/155,106

(22) Filed: Oct. 9, 2018

(51) Int. Cl.
*G06Q 30/00* (2012.01)
*G06Q 30/02* (2012.01)
*H04L 12/58* (2006.01)

(52) U.S. Cl.
CPC ..... *G06Q 30/0217* (2013.01); *G06Q 30/0239* (2013.01); *H04L 51/02* (2013.01)

(58) Field of Classification Search
CPC ............... G06Q 30/0207–0277; H04L 51/02
See application file for complete search history.

(56) References Cited

U.S. PATENT DOCUMENTS

| | | | |
|---|---|---|---|
| 2003/0204441 A1* | 10/2003 | Ellis | G06Q 30/0238 705/14.26 |
| 2008/0319841 A1* | 12/2008 | Oliver | G06Q 30/0248 705/14.47 |
| 2011/0173060 A1 | 7/2011 | Gallagher | |
| 2013/0110599 A1* | 5/2013 | Gonzales | G06Q 30/0238 705/14.16 |
| 2013/0132178 A1* | 5/2013 | Masuko | G06Q 30/0217 705/14.19 |
| 2017/0169476 A1* | 6/2017 | Nomula | G06N 20/00 |

* cited by examiner

*Primary Examiner* — Kambiz Abdi
*Assistant Examiner* — Christopher Stroud
(74) *Attorney, Agent, or Firm* — Allen, Dyer, Doppelt, + Gilchrist, P.A.

(57) ABSTRACT

A system for processing a digital promotion may include a mobile device associated with a given user and a digital promotion server. The server may operate a messenger bot associated with a first digital promotion for a product. The first digital promotion may be redeemable at a redemption location. The server may collect information from the messenger bot and communicate the first digital promotion through the messenger bot to the mobile device based upon the collected information. The server may also permit redemption of the first digital promotion at the redemption location and obtain an identification of another product included with the product on a guest check from the redemption location and associated with the given user. A second digital promotion associated with the at least one other product and for redemption at another location other than the redemption location may be determined and communicated to the mobile device.

19 Claims, 3 Drawing Sheets

SYSTEM FOR PROCESSING A DIGITAL PROMOTION BASED UPON A GUEST CHECK PRODUCT AND RELATED METHODS

TECHNICAL FIELD

The present invention relates to the field of electronics, and more particularly, to messenger bot based communications and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A system for processing a digital promotion may include a mobile wireless communications device associated with a given user and a digital promotion server. The digital promotion server may be configured to operate a messenger bot associated with a first digital promotion for a given product on the mobile wireless communications device. The first digital promotion may be redeemable at a redemption location. The digital promotion server may be configured to collect information from the messenger bot and communicate the first digital promotion for the given product through the messenger bot to the mobile wireless communications device based upon the collected information. The digital promotion server may also be configured to permit redemption of the first digital promotion for the given product at the redemption location and obtain an identification of at least one other product included with the given product on a guest check from the redemption location and associated with the given user. The digital promotion server may also be configured to determine a second digital promotion associated with the at least one other product and for redemption at another location other than the redemption location and communicate the second digital promotion to the mobile wireless communications device.

The digital promotion server may be configured to determine the second digital promotion based upon the given product, for example. The digital promotion server may be configured to communicate the second digital promotion through the messenger bot.

The second digital promotion may be for the at least one other product on the guest check, for example. The second digital promotion may be for a competitor product to the given product, for example.

The second digital promotion may be for a competitor product to the at least one other product on the guest check. The given product may include a given brand of products, and the second digital promotion may be for a product of the given brand of products.

The at least one other product may include a given brand of products, for example. The second digital promotion may be for a product of the given brand of products.

The first digital promotion may be for an entire purchase price of the given product and redeemable during a purchase transaction for the given product at the redemption location, for example. The information collected from the messenger bot may include at least one of a user name, social-media profile, user date of birth, user geographic location, and desired product from a brand thereof, for example. The digital promotion server may be configured to cooperate with the mobile wireless communications device to store the second digital promotion in a digital wallet associated with the given user.

A method aspect is directed to a method of processing a digital promotion. The method may include using a processor and a memory cooperating therewith to operate a messenger bot associated with a first digital promotion for a given product on a mobile wireless communications device associated with a given user. The first digital promotion may be redeemable at a redemption location. The method may also include using the processor to collect information from the messenger bot and communicate the first digital promotion for the given product through the messenger bot to the mobile wireless communications device based upon the collected information. The method may further include using the processor to permit redemption of the first digital promotion for the given product at the redemption location and obtain an identification of at least one other product included with the given product on a guest check from the redemption location and associated with the given user. The method may also include using the processor to determine a second digital promotion associated with the at least one other product and for redemption at another location other than the redemption location and communicate the second digital promotion to the mobile wireless communications device.

A computer readable medium aspect is directed to a non-transitory computer readable medium for processing a digital promotion. The non-transitory computer readable medium includes computer executable instructions that when executed by a processor cause the processor to perform operations. The operations may include operating a messenger bot associated with a first digital promotion for a given product on a mobile wireless communications device associated with a given user. The first digital promotion may be redeemable at a redemption location. The operations may also include collecting information from the messenger bot and communicating the first digital promotion for the given product through the messenger bot to the mobile wireless communications device based upon the collected information. The operations may also include permitting redemption of the first digital promotion for the given product at the redemption location and obtaining an identification of at least one other product included with the given product on a guest check from the redemption location and associated with the given user. The operations may further include determining a second digital promotion associated with the at least one other product and for redemption at another location other than the redemption location and communicating the second digital promotion to the mobile wireless communications device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
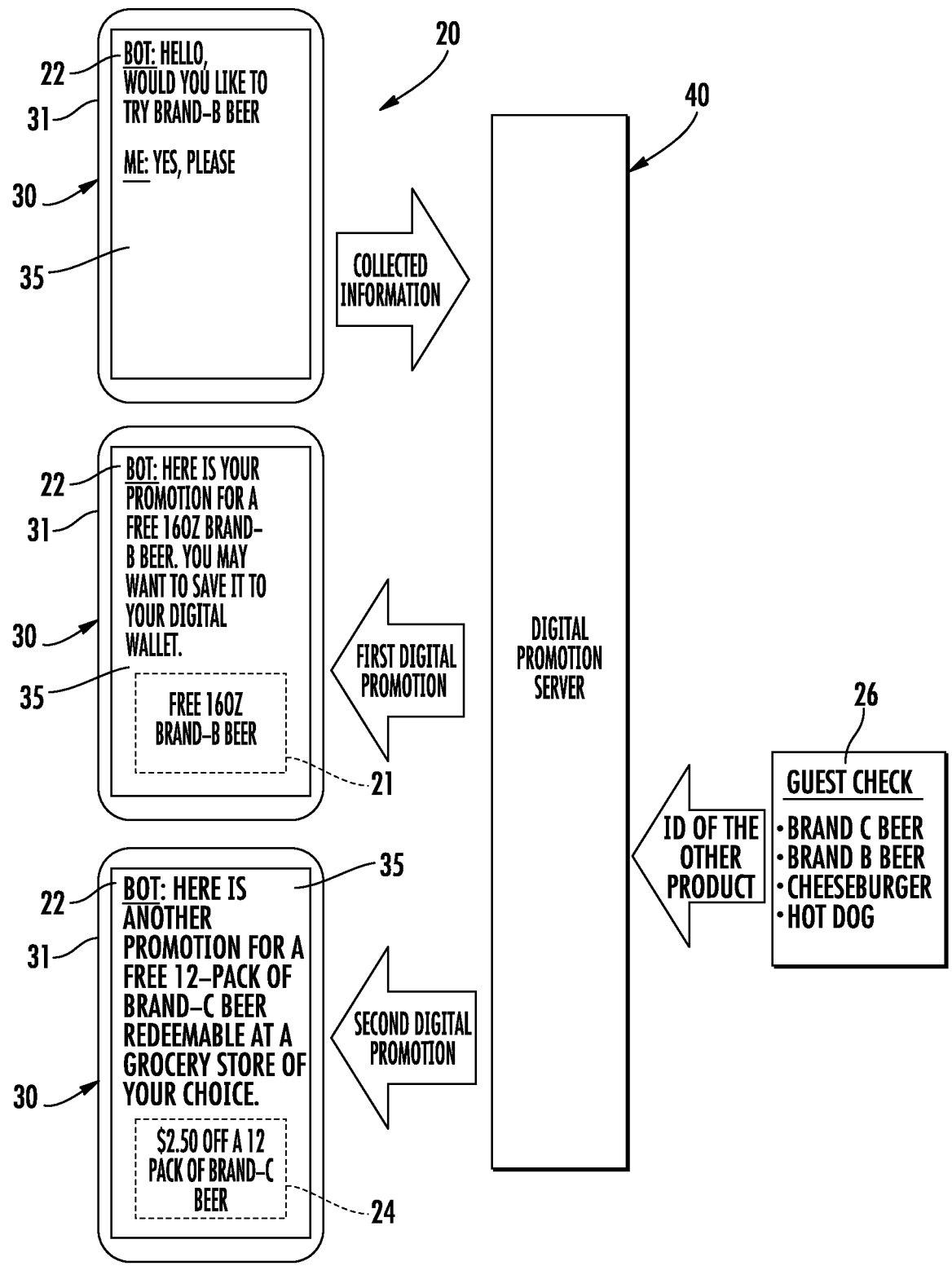
FIG. 1 is a schematic diagram of a system for processing a digital promotion in accordance with an embodiment.
Figure 2:
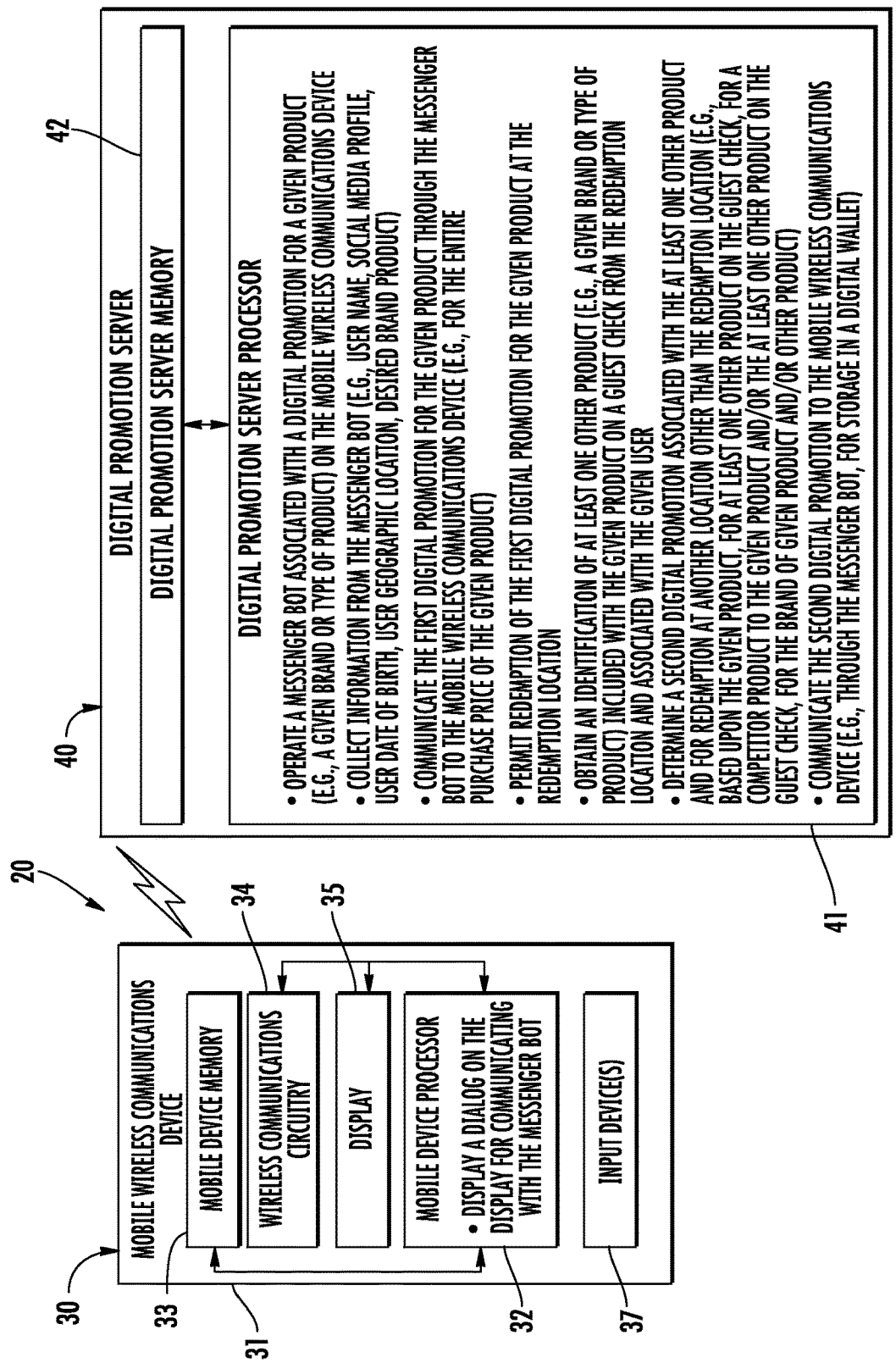
FIG. 2 is a schematic block diagram of a system for processing a digital promotion in accordance with an embodiment.

Referring initially to FIGS. 1 and 2, a system 20 for processing a digital promotion includes a mobile wireless communications device 30 associated with a given user. The mobile wireless communications device 30 illustratively includes a portable housing 31, a mobile device processor 32, a mobile device memory 33 coupled to the mobile device processor, and wireless communications circuitry 34 coupled to the mobile device processor. The mobile wireless communications device 30 also includes a display 35, such as, for example, a touch display, carried by the portable housing 31 and coupled to the mobile device processor 32. The mobile wireless communications device 30 may include one or more input devices 37 and other types of output devices. The mobile wireless communications device 30 may be a mobile phone or smartphone, a tablet computer, or other type of mobile wireless communications device, as will be appreciated by those skilled in the art.

The system 20 also includes a digital promotion server 40 communicatively coupled to the mobile wireless communications device 30. The digital promotion server 40 includes a digital promotions processor 41 and a digital promotions memory 42 coupled to the digital promotions processor. The digital promotion server 40 may be a remote computer, for example.

Figure 3:
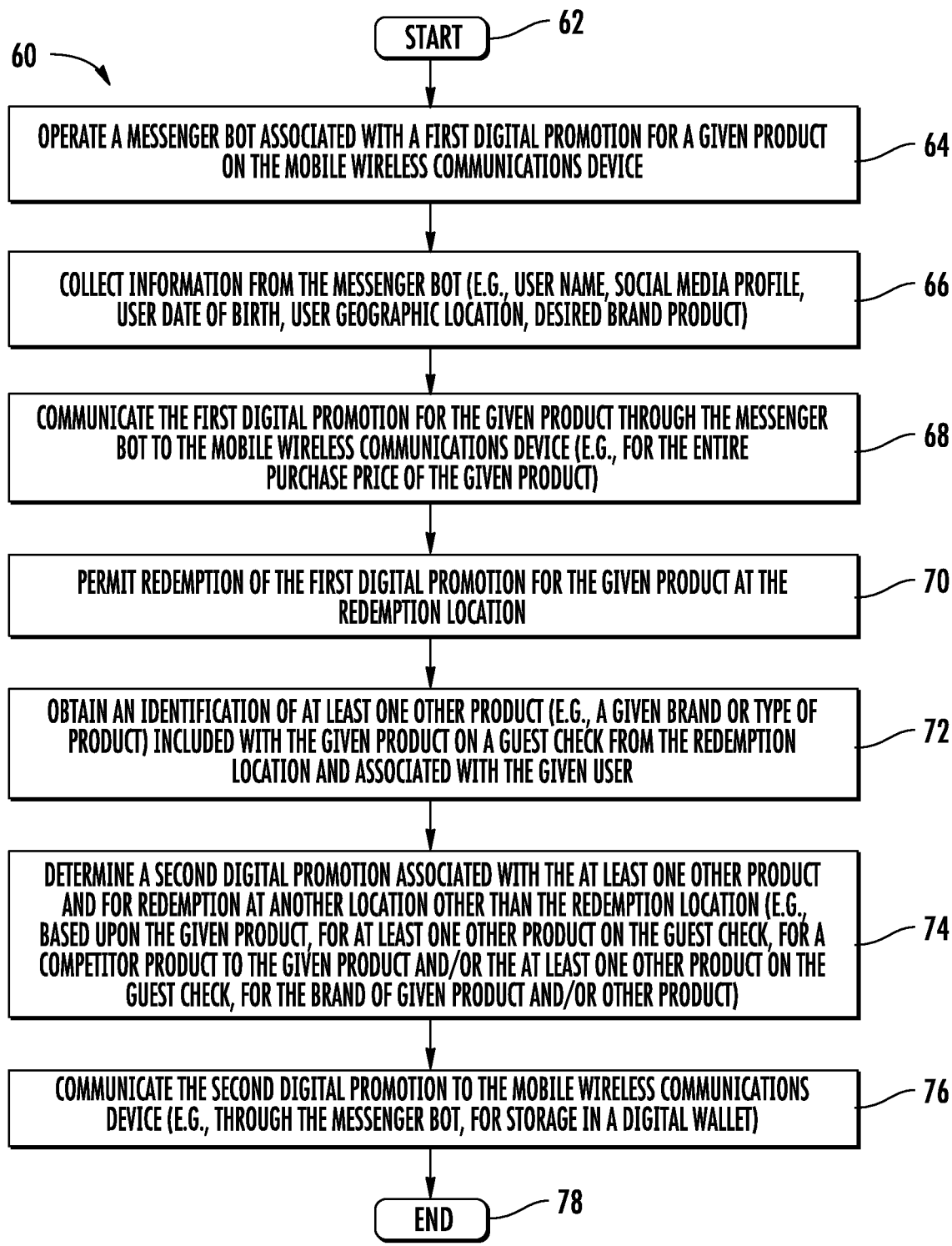
FIG. 3 is a flow chart illustrating operation of a digital promotion server of a system for processing a digital promotion in accordance with an embodiment.

Referring now additionally to the flowchart 60 in FIG. 3, details of operation of the system 20 will now be described with reference to the digital promotion server 40. Beginning at Block 62, the digital promotion server 40 operates a messenger bot 22 associated with a first digital promotion 21 for a given product on the mobile wireless communications device 30 (Block 64). The first digital promotion 21 is redeemable at a redemption location, for example, a restaurant, bar, etc. Of course, the first digital promotion 21 may be redeemable at other types of locations.

The given product may be a brand and/or class or type of product, for example, and thus the messenger bot 22 may be associated with a given brand. The first digital promotion 21 may be displayed on the display 35 of the mobile wireless communications device 30, for example, inline in a social media feed. An exemplary first digital promotion 21 may be along the lines of "Enjoy a Brand-B Beer On Brand-B". Of course, the first digital promotion 21 may be included on a website, in an email, and/or other electronic form.

The messenger bot 22 may be implemented in the form of a two-way dialog box that permits the given user to communicate by way of typing (i.e., written communication). In some embodiments, the messenger bot 22 may operate through voice commands or spoken words. The underlying program behind the messenger bot 22 may be a different program, application, and/or website than that serving the first digital promotion 21. For example, the first digital promotion 21 may be inline in a news feed on Facebook while the messenger bot 22 may be executed through the Facebook Messenger program or application. The application or program associated with the messenger bot 22 may be executed or opened, for example, based upon user selection of the first digital promotion 21.

At Block 66, the digital promotion server 40 collects information from or through the messenger bot 22. For example, through the messenger bot 22, the digital promotion server 40 may obtain the given user's name, social media username, email address, social media profile, date of birth, geographic location, and/or desired product from the brand. Of course, the digital promotion server 40 may collect other and/or additional types of information.

The digital promotion server 40 communicates the first digital promotion 21 for the given product through the messenger bot 22 to the mobile wireless communications device 30 based upon the collected information (Block 68). The first digital promotion 21 may be redeemable for an entire purchase price of the given product. The digital promotion server 40 permits redemption of the first digital promotion 21 at the redemption location (Block 70). The first digital promotion 21 may be redeemable only at the potential redemption location. In some embodiments, the digital promotion server 40 may permit redemption of the first digital promotion at other and/or additional redemption locations, for example, based upon selection from the given user.

In some embodiments, the digital promotion server 40 and the mobile wireless communications device 30 may cooperate to save the first digital promotion 21 in a digital wallet associated with the user, for example, at either or both the mobile device memory 33 and the digital promotions memory 42. The first digital promotion 21 may be redeemed, for example, at a point-of-sale (POS) terminal, at the selected redemption location. For example, in an exemplary implementation, the given user may have an open tab or working guest check 26 at the redemption location. Brand-B Beer may be on the guest check 26 and the first digital promotion 21 may be applied toward the guest check for the purchase price of the Brand-B Beer.

At Block 72, the digital promotion server 40 obtains an identification of at least one other product included with the given product on the guest check 26 and associated with the given user. With respect to the Brand-B Beer example, along with the Brand-B Beer, the given user may have purchased a Brand-C Beer, a hotdog, and a double cheeseburger, all of which may be included on the guest check 26. The identification may include a product identification number, for example, or other unique identifier associated with items (e.g., food and beverage) at the redemption location.

At Block 74, the digital promotion server 40 determines a second digital promotion 24 associated with one or more of the other products on the guest check. The second digital promotion 24 is redeemable at another location other than the given location (e.g., a grocery store, another restaurant, etc.) In other words, with respect to the Brand-B Beer example above, the second digital promotion 24 may be determined based upon or associated with any of the Brand-C Beer, hotdog, and double cheeseburger. The second digital promotion 24 may be determined based upon the given product. For example, the digital promotion server 40 may determine the second digital promotion 24 based upon Brand-B Beer. The second digital promotion 24 may be for a 12-Pack of Brand-B Beer, for example, or a related or associated product to Brand-B Beer (e.g., same company, same brand, related or complimentary item, etc.).

In another embodiment, the second digital promotion 24 may be one or more other products on the guest check besides the given product. With respect to the Brand-B Beer example above, the second digital promotion 24 may be for hotdogs, ground beef (for hamburgers), cheese, Brand-C Beer, and/or buns. The second digital promotion 24 may be for the same brand of product or products as other products (other than Brand-B Beer) on the guest check 26, for example, Brand-C beverages. Still further, the second digital promotion 24 may be for a competitor product to either or both of the given product (e.g., Brand-B Beer) and other items on the guest check 26 (e.g., Brand-C Beer). For example, while Brand-B Beer and Brand-C Beer are both on the guest check 26, the second digital promotion 24 may be for Brand-A Beer.

The second digital promotion 24 is communicated to the mobile wireless communications device 30 (Block 76), for example, through the messenger bot 22. Similarly to the first digital promotion 21, the digital promotion server 40 and the mobile wireless communications device 30 may cooperate to save the second digital promotion 24 in a digital wallet associated with the user, for example, at either or both the mobile device memory 33 and the digital promotions memory 42. The operations end at Block 78.

A method aspect is directed to a method of processing a digital promotion. The method includes using a processor 41 and a memory 42 cooperating therewith to operate a messenger bot 22 associated with a first digital promotion 21 for a given product on a mobile wireless communications device 30 associated with a given user. The first digital promotion 21 is redeemable at a redemption location. The method also includes using the processor 41 to collect information from the messenger bot 22 and communicate the first digital promotion 21 for the given product through the messenger bot to the mobile wireless communications device 30 based upon the collected information. The method further includes using the processor 41 to permit redemption of the first digital promotion 21 for the given product at the redemption location and obtain an identification of at least one other product included with the given product on a guest check 26 from the redemption location and associated with the given user. The method also includes using the processor 41 to determine a second digital promotion 24 associated with the at least one other product and for redemption at another location other than the redemption location and communicate the second digital promotion to the mobile wireless communications device 30.

A computer readable medium aspect is directed to a non-transitory computer readable medium for processing a digital promotion. The non-transitory computer readable medium includes computer executable instructions that when executed by a processor 41 cause the processor to perform operations. The operations include operating a messenger bot 22 associated with a first digital promotion 21 for a given product on a mobile wireless communications device 30 associated with a given user. The first digital promotion 21 is redeemable at a redemption location. The operations may also include collecting information from the messenger bot 22 and communicating the first digital promotion 21 for the given product through the messenger bot to the mobile wireless communications device 30 based upon the collected information. The operations also include permitting redemption of the first digital promotion 21 for the given product at the redemption location and obtaining an identification of at least one other product included with the given product on a guest check 26 from the redemption location and associated with the given user. The operations further include determining a second digital promotion 24 associated with the at least one other product and for redemption at another location other than the redemption location and communicating the second digital promotion to the mobile wireless communications device 30.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital promotion comprising:
   a point-of-sale (POS) terminal at a physical redemption location serving a given food or beverage product;
   a mobile wireless communications device associated with a given user; and
   a digital promotion server configured to
      operate a messenger bot associated with a first digital promotion for the given food or beverage product on the mobile wireless communications device, the messenger bot being implemented in a form of a two-way dialog between the messenger bot and the given user, and the first digital promotion being redeemable toward a purchase of the given food or beverage product at the physical redemption location,
      collect information from the messenger bot,
      communicate the first digital promotion for the given food or beverage product through the messenger bot to the mobile wireless communications device for display thereon based upon the collected information,
      permit redemption of the first digital promotion for the given food or beverage product at the physical redemption location,
      cooperate with the POS terminal to obtain an identification of at least one other food or beverage product included with the given food or beverage product on a guest check associated with a food and beverage tab for the given user and maintained by the POS terminal at the physical redemption location,
      determine a second digital promotion associated with the at least one other food or beverage product on the guest check and for redemption at another location other than the physical redemption location, the second digital promotion being redeemable toward a packaged configuration of a competitor product of the at least one other food or beverage product on the guest check, and communicate the second digital promotion, via the messenger bot, to the mobile wireless communications device for display thereon.

2. The system of claim 1 wherein the digital promotion server is configured to determine the second digital promotion based upon the given food or beverage product.

3. The system of claim 1 wherein the given food or beverage product comprises a given brand of food or beverage products, and wherein the second digital promotion is for a product of the given brand of food or beverage products.

4. The system of claim 1 wherein the at least one other food or beverage product comprises a given brand of food or beverage products; and wherein the second digital promotion is for a product of a different brand of food or beverage products.

5. The system of claim 1 wherein the first digital promotion is for an entire purchase price of the given food or beverage product and redeemable during a purchase transaction for the given food or beverage product at the redemption location.

6. The system of claim 1 wherein the information collected from the messenger bot comprises at least one of a user name, social-media profile, user date of birth, user geographic location, and desired product from a brand thereof.

7. The system of claim 1 wherein the digital promotion server is configured to cooperate with the mobile wireless communications device to store the second digital promotion in a digital wallet associated with the given user.

8. A digital promotion server for processing a digital promotion comprising:

a processor and a memory cooperating therewith to
operate a messenger bot associated with a first digital promotion for a given food or beverage product on a mobile wireless communications device associated with a given user, the messenger bot being implemented in a form of a two-way dialog between the messenger bot and the given user, and the first digital promotion being redeemable toward a purchase of the given food or beverage product at a physical redemption location serving the given food or beverage product and having a point-of-sale (POS) terminal thereat, collect information from the messenger bot, communicate the first digital promotion for the given food or beverage product through the messenger bot to the mobile wireless communications device for display thereon based upon the collected information, permit redemption of the first digital promotion for the given food or beverage product at the physical redemption location, cooperate with the POS terminal to obtain an identification of at least one other food or beverage product included with the given food or beverage product on a guest check associated with a food or beverage tab for the given user and maintained by the POS terminal at the physical redemption location, determine a second digital promotion associated with the at least one other food or beverage product on the guest check and for redemption at another location other than the physical redemption location, the second digital promotion being redeemable toward a packaged configuration of a competitor product of the at least one other food or beverage product on the guest check, and communicate the second digital promotion, via the messenger bot, to the mobile wireless communications device for display thereon.

9. The digital promotion server of claim 8 wherein the processor is configured to determine the second digital promotion based upon the given food or beverage product.

10. The digital promotion server of claim 8 wherein the given food or beverage product comprises a given brand of food or beverage products, and wherein the second digital promotion is for a product of the given brand of food or beverage products.

11. The digital promotion server of claim 8 wherein the at least one other food or beverage product comprises a given brand of food or beverage products; and wherein the second digital promotion is for a product of a different brand of food or beverage products.

12. A method of processing a digital promotion comprising:

using a processor and a memory cooperating therewith to
operate a messenger bot associated with a first digital promotion for a given food or beverage product on a mobile wireless communications device associated with a given user, the messenger bot being implemented in the form of a two-way dialog between the messenger bot and the given user, and the first product being associated with a given brand, and the first digital promotion being redeemable toward a purchase of the given food or beverage product at a redemption location serving the given food or beverage product and having a point-of-sale (POS) terminal thereat, collect information from the messenger bot, communicate the first digital promotion for the given food or beverage product through the messenger bot to the mobile wireless communications device for display thereon based upon the collected information, permit redemption of the first digital promotion for the given food or beverage product at the physical redemption location, cooperate with the POS terminal to obtain an identification of at least one other food or beverage product included with the given food or beverage product on a guest check associated with a food or beverage tab for the given user and maintained by the POS terminal at the redemption location, determine a second digital promotion associated with the at least one other food or beverage product on the guest check and for redemption at another location other than the physical redemption location, the second digital promotion being redeemable toward a packaged configuration of a competitor product of the at least one other food or beverage product on the guest check, and communicate the second digital promotion, via the messenger bot, to the mobile wireless communications device for display thereon.

13. The method of claim 12 wherein using the processor comprises using the processor to determine the second digital promotion based upon the given food or beverage product.

14. The method of claim 12 wherein the given food or beverage product comprises a given brand of food or beverage products, and wherein the second digital promotion is for a product of the given brand of food or beverage products.

15. The method of claim 12 wherein the at least one other food or beverage product comprises a given brand of food or beverage products; and wherein the second digital promotion is for a product of a different brand of food or beverage products.

16. A non-transitory computer readable medium for processing a digital promotion, the non-transitory computer readable medium comprising computer executable instructions that when executed by a processor cause the processor to perform operations, the operations comprising:

operating a messenger bot associated with a first digital promotion for a given food or beverage product on a mobile wireless communications device associated with a given user, the messenger bot being implemented in a form of a two-way dialog between the messenger bot and the given user, and the first digital promotion being redeemable at a physical redemption location serving the given food or beverage product and having a point-of-sale (POS) terminal thereat;

collecting information from the messenger bot;

communicating the first digital promotion for the given food or beverage product through the messenger bot to the mobile wireless communications device for display thereon based upon the collected information;

permitting redemption of the first digital promotion for the given product at the physical redemption location;

cooperating with the POS terminal to obtain an identification of at least one other food or beverage product included with the given food or beverage product on a guest check associated with a food and beverage tab for the given user and maintained by the POS terminal at the physical redemption location;

determining a second digital promotion associated with the at least one other food or beverage product on the guest check and for redemption at another location other than the physical redemption location, the second digital promotion being redeemable toward a packaged configuration of a competitor product of the at least one other food or beverage product on the guest check; and communicating the second digital promotion, via the messenger bot, to the mobile wireless communications device for display thereon.

17. The non-transitory computer readable medium of claim 16 wherein the operations comprise determining the second digital promotion based upon the given food or beverage product.

18. The non-transitory computer readable medium of claim 16 wherein the given food or beverage product comprises a given brand of food or beverage products, and wherein the second digital promotion is for a product of the given brand of food or beverage products.

19. The non-transitory computer readable medium of claim 16 wherein the at least one other food or beverage product comprises a given brand of food or beverage products; and wherein the second digital promotion is for a product of a different brand of food or beverage products.

* * * * *